Figure 1:
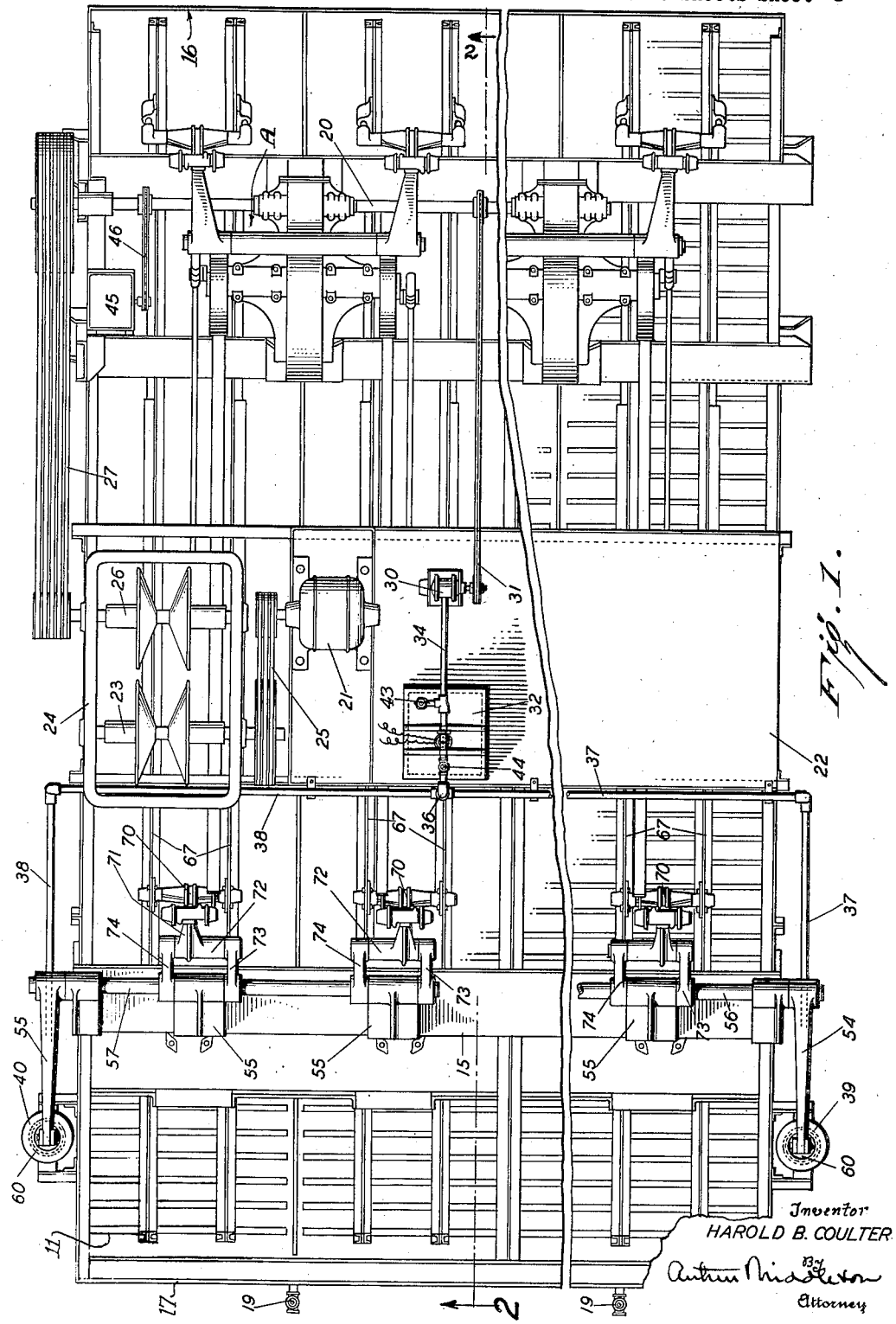

Aug. 21, 1934.   H. B. COULTER   1,971,153
CLASSIFIER
Filed Dec. 18, 1931   3 Sheets-Sheet 1

Inventor
HAROLD B. COULTER
Attorney

Aug. 21, 1934.  H. B. COULTER  1,971,153
CLASSIFIER
Filed Dec. 18, 1931   3 Sheets-Sheet 2
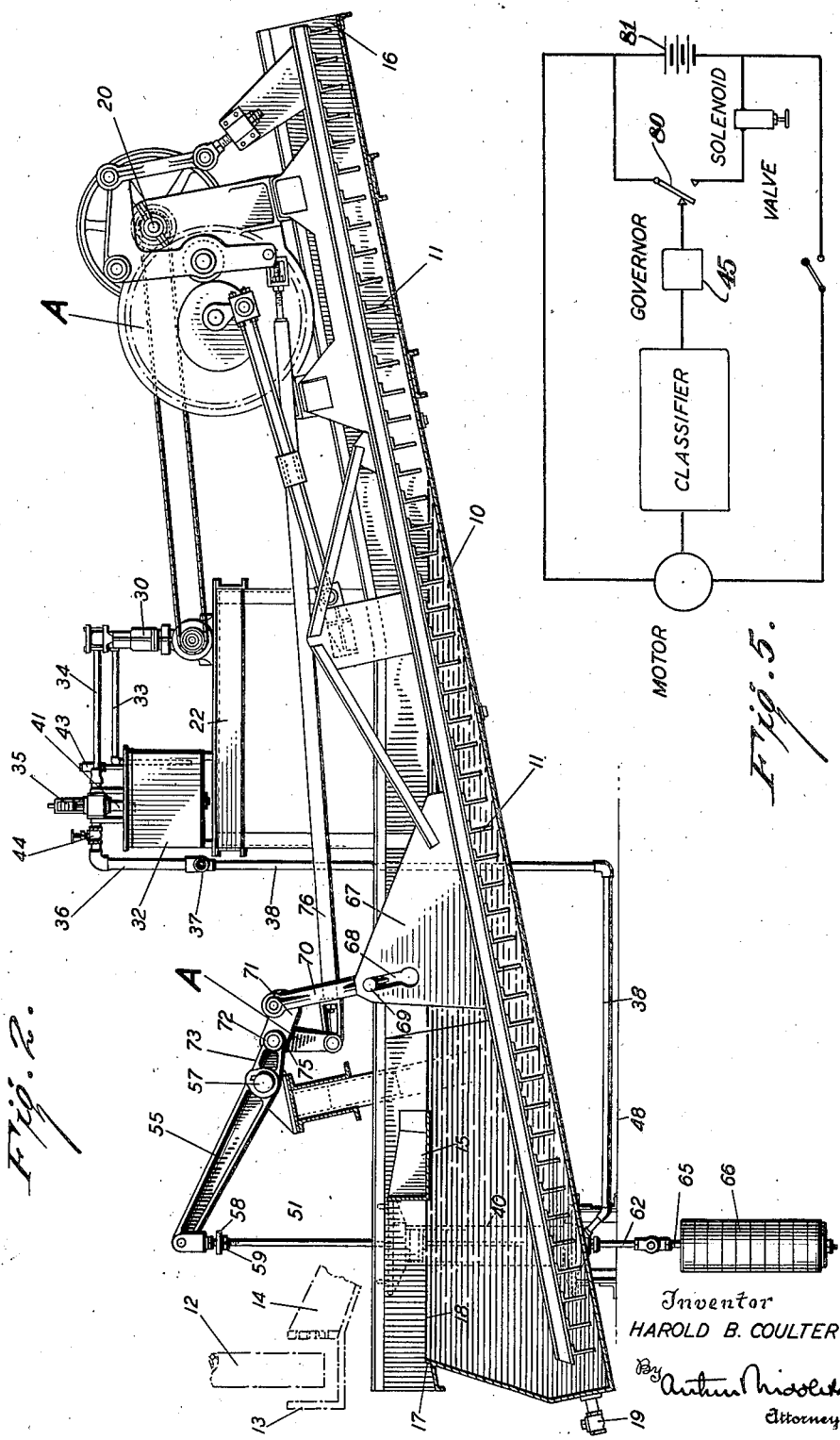
Inventor
HAROLD B. COULTER Aug. 21, 1934.     H. B. COULTER     1,971,153
CLASSIFIER
Filed Dec. 18, 1931     3 Sheets-Sheet 3
Fig. 4.
Fig. 3.
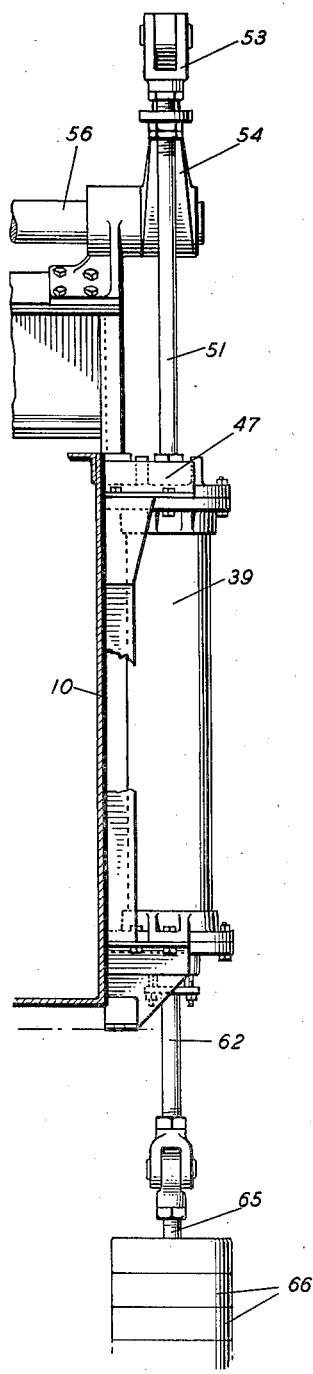
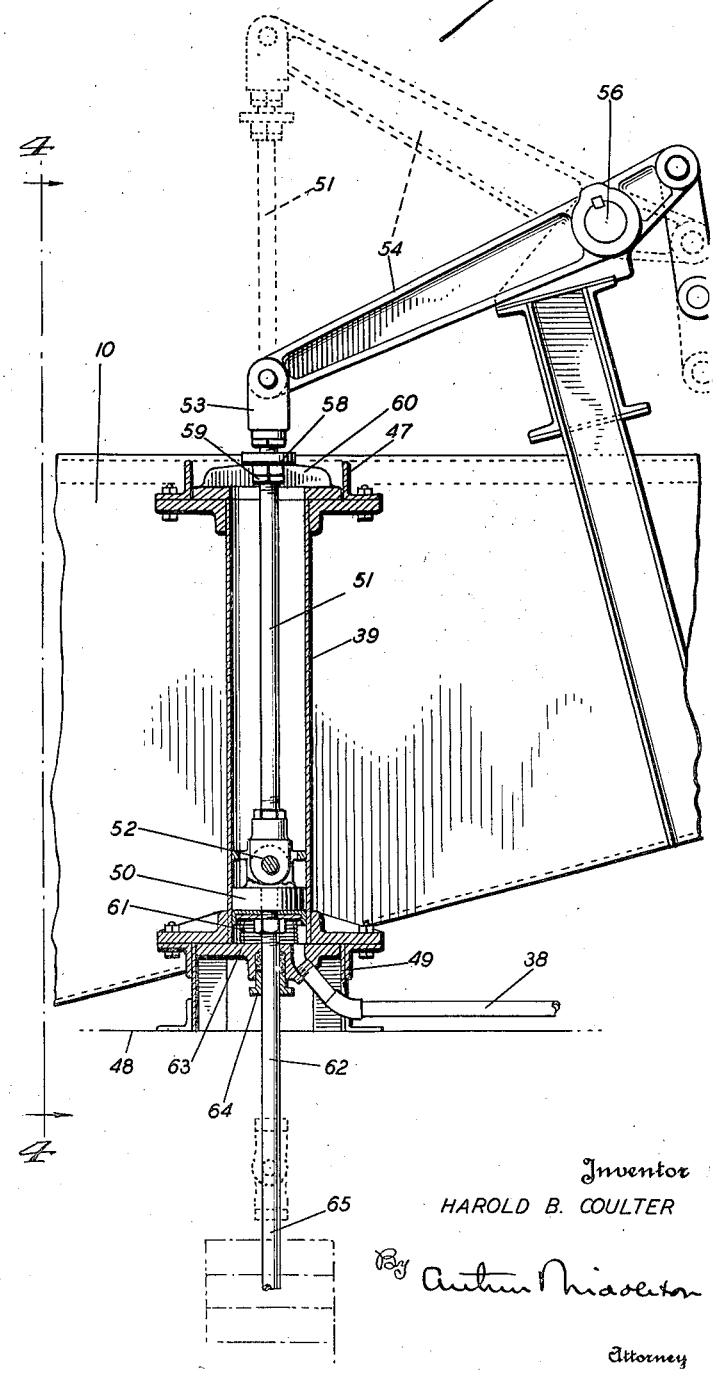
Inventor
HAROLD B. COULTER
Attorney Patented Aug. 21, 1934

1,971,153

UNITED STATES PATENT OFFICE 1,971,153

CLASSIFIER

Harold B. Coulter, Denver, Colo., assignor to The Dorr Company, Inc., New York, N. Y., a corporation of Delaware Application December 18, 1931, Serial No. 581,783

11 Claims. (Cl. 209—462)

This invention relates to classifiers of the type generally applicable to metallurgy, sewage and the like for selectively separating solids contained in liquids. More specifically, the invention appertains to the well known Dorr type of classifier and an automatic control for raising the submergible classifier rake either entirely out of the bath in which it operates or to a point near the upper region thereof when the operation of the classifier is discontinued intentionally or otherwise and for automatically lowering the rake when the operation is resumed. With means of this character, solids contained in the bath are prevented from settling on the rake and no difficulty is experienced in starting the classifier after it has been out of operation even for a considerable period of time.

The invention comprises a control for lifting the rake, which in turn is governed by the rake motivating mechanism. In a preferred arrangement the rake is automatically moved to raised inoperative position as a consequence of rake stoppage, and lowered when the operation of the rake is resumed.

The nature of the invention will become apparent from the following description considered in connection with the accompanying drawings illustrating a preferred form of the invention and in which, Fig. 1 is a plan view of one form of the invention applied to a quadruplex Dorr classifier, Fig. 2 is a sectional view taken substantially on line 2—2 of Fig. 1, Fig. 3 is an enlarged detail view, partly in section, of one of the hydraulic cylinders and its associated mechanisms for raising and lowering the rake, Fig. 4 is another view of the cylinder taken on line 4—4 of Fig. 3, and Fig. 5 is a wiring diagram.

Referring to the drawings, particularly Figs. 1 and 2, reference character 10 indicates the tank of a quadruplex Dorr classifier having four rakes 11 mounted therein and adapted to have imparted thereto the well known D movement. The mechanism or motivating connection for imparting this reciprocating motion to the rakes is indicated generally by reference letter A. As shown, over end feed is utilized, the feed being introduced through feed pipe 12 into feed launder 13 from which it flows through suitable connecting troughs 14 into feed trough 15 and thence into each of the four sections of the classifier tank. The solids selected out of the bath by rakes 11 are carried thereby to the upper end of the tank and are discharged at 16 while the liquid or slime overflows at 17. The bath level in the tank is maintained at the level 18 by the overflow 17. Liquid may be drained from the tank sections thru drain cocks 19.

The rakes are driven from a constantly rotating drive shaft 20 which in turn is driven preferably by an electric motor 21 through suitable power transmitting means. As shown, the motor 21, mounted on platform 22 drives shaft 23 of a Reeves variable speed transmission 24 through Texropes 25. Shaft 23 drives shaft 26 of transmission 24 which in turn is connected to drive shaft 20 through Texropes 27.

The means for effecting the automatic raising and lowering of the rakes at the stopping and starting of the classifier will now be described. A fluid motor 30 of any suitable type is mounted on the platform 22 and is driven by drive shaft 20 through a roller chain 31. A reservoir tank 32, also mounted on platform 22 adjacent pump 30, contains a suitable supply of liquid, such as water, oil or any suitable non-freezing liquid. The suction side of pump 30 is connected to tank 32 by a pipe 33 which extends almost to the bottom of tank 32. The pressure side of pump 30 is connected by a pipe 34 to a solenoid operated valve 35 preferably mounted above the reservoir tank 32 and valve 35 is connected by pipe 36 to pipes 37 and 38 which are connected to the lower ends of cylinders 39 and 40 respectively. The solenoid operated valve 35 is also connected by a pipe 41 to the upper part of reservoir tank 32. A by-pass 42 having a pressure relief valve 43 therein connects with pipe 34 adjacent valve 35 with the upper part of tank 32. A hand operated valve 44 controls the rate of flow of fluid through pipes 36, 37 and 38.

A centrifugal governor 45 is mounted on the classifier head frame and is driven from drive shaft 20 through chain 46 running over sprockets. This governor maintains a contact 80 in an electrical circuit which connects the solenoid operated valve 35 with a suitable source of power 81 as long as the classifier is in operation and breaks the contact when the classifier stops. When the solenoid is energized, valve 35 permits the passage of liquid from the pump 30 to the cylinders 39 and 40 and when the solenoid is de-energized, valve 35 cuts off pipe 36 from the pump and connects the latter with the reservoir tank through pipe 41.

The two hydraulic cylinders 39 and 40 are shown attached to the sides of the classifier tank 10 by suitable brackets 47 and to the floor of the substructure 48 by a bracketed support 49. A piston 50 of the cup leather type operates in each cylinder 39 and 40 and each piston is pivotally connected to one end of a connecting rod 51 by a wrist pin 52. The upper ends of the connecting rods 51 carry clevises 53 which are pivotally connected to lever arms 54 and 55 respectively which in turn are keyed to the outer ends of lifting lever shafts 56 and 57. An adjustable stop nut 58 is threaded on the upper end of each of the connecting rods 51 and is retained in adjusted position by a lock nut 59 to limit the downward movement of the pistons 50 by engagement with the cylinder heads 60. The adjustable stops 58 also regulate the extent of travel or movement of the lever arms 54 and 55 and the rakes 11 as will hereinafter appear. A coiled spring 61 in the bottom of each cylinder acts as a cushion stop for the pistons in their downward movement. A piston rod 62 secured to each piston 50 extends through the lower cylinder head 63 and packing gland 64 and has pivotally secured to the lower end thereof a rod 65 to which are attached in any suitable manner a plurality of weights 66. These weights should be sufficiently heavy to counterbalance the rakes and provide enough excess weight to overcome friction in the mechanisms.

Two spaced rake hangers 67 are secured to each of the rakes 11 adjacent their rear or lower ends and, as shown, each hanger 67 is provided in its upper portion with a downwardly extending slot 68 to permit the D movement of the rakes independently of the lifting mechanism. A hanger rod 69 extends through the slots 68 of the spaced pair of hangers 67 on each rake 11. The hanger rods 69 engage the hangers 67 adjacent their outer ends and each rod 69 is secured at its central portion to the lower end of a hanger link 70 which is pivotally connected at its upper end to the outer end of an arm 71 of a bell crank lever 72 which is pivoted to and disposed between the outer ends of spaced lifting levers 73 and 74. The levers 73 and 74 of each pair are keyed at their inner ends to shafts 56 or 57 and are disposed one on each side of the lever arms 55. The other arm 75 of each bell crank lever 72 is pivoted to a reach rod 76 which forms part of the mechanism for imparting the heretofore mentioned well known D movement to the classifier rakes.

The operation is as follows: During operation of the classifier, drive shaft 20 will be continually rotating and the rakes 11 will, in general, be in their operating position shown in Fig. 2. The governor 45 will be in operation and will maintain electrical contact 80 in the power line to the solenoid valves 35 and retain the valve in such position that pump 30 is connected to the cylinders 39 and 40. Pump 30, driven from shaft 20, thus maintains a constant and sufficient pressure in the cylinders 39 and 40 to cause the pistons 50 to remain in the upper ends of cylinders 39 and 40 against the action of the weights 66 and maintain the rakes in operating position.

In the event the classifier stops for any reason, the current supply to the solenoid valve 35 is broken at 80 by the governor 45, the solenoid is de-energized and moves valve 35 to a position to disconnect the pump from the cylinders and to connect the cylinders through pipe 41 with reservoir tank 32. This releases the pressure on the liquid in the cylinders 39 and 40, the weights 66 cause the pistons 50 to move downwardly and force the liquid from the cylinders into the reservoir tank. The hand valve 44 controls the rate at which the liquid escapes from the cylinders. As the pistons move downwardly, lever arms 55 and lifting levers 73 are rocked on shafts 56 and 57 and this movement lifts the rakes 11 upwardly to their raised positions as shown in dotted lines in Fig. 2. The upward movement of the rakes is continued until the stops 58 come in contact with the cylinder heads 60 as shown in Fig. 3. Coiled springs 61 cushion the stopping of the rakes in their raised position.

As soon as operation of the classifier is resumed, governor 45 operates to again connect solenoid valve 35 with the current supply. The solenoid is energized and moves the valve 35 to disconnect cylinders 39 and 40 with the reservoir tank 32 and to again connect the cylinders with pump 30 which draws liquid from tank 32 through pipe 33 and forces it through pipes 34, 36, 37 and 38 to the cylinders 39 and 40. As liquid is forced into the cylinders, the pistons therein are raised and the rakes 11 are lowered into their operating position. Pump 30 continues to force liquid into the cylinders until the pressure therein is sufficient to maintain the pistons at the upper ends of the cylinders. When this pressure has been reached, pressure release valve 43 is forced open and the liquid from the pump is passed through by-pass 42 into the reservoir tank 32. Hand valve 44 controls the speed at which the rakes are lowered. The rakes remain in their operating position until the classifier again stops, when the solenoid will be de-energized and valve 35 will release the pressure in the cylinders and thereby cause the rakes to be raised again as has previously been described.

While the invention has been shown as described as applied to a quadruplex rake classifier, it may obviously be as effectually applied to a classifier having a single rake or any desired multiple thereof. Moreover, if desired, only one cylinder may be employed, in lieu of the two shown, and the lifting mechanism may be operated pneumatically instead of hydraulically as described.

Inasmuch as the submerged portion of the rakes may be entirely unsubmerged when in raised position or resting in a position immediately below the surface of the liquid in the tank to attain the objects of the invention, it is intended the term "unsubmerged" used herein and in the claims means that the rakes are completely free of the bath or that some part of the normally submerged portion lies just below the surface of the bath.

Since many changes may be effected in the apparatus shown and described without departing from the spirit or scope of the invention, it is intended that the invention be not limited except by the scope of the appended claims.

I claim:

1. A classifier comprising a tank adapted to contain a bath, a rake operable in the tank and having a lower operating position and a raised inoperative position, the rake having a portion thereof submergible in the bath, when in operating position and unsubmerged when in raised position, motivating mechanism for reciprocating the rake, and a control governed by said motivating mechanism and effective to move the rake, to raised position when the operation of the rake is discontinued.

2. A classifier comprising a tank adapted to contain a bath, a rake operable in the tank and having a lower operating position and a raised inoperative position, the rake having a portion thereof submerged in the bath when in operating position and unsubmerged when in raised position, a motivating mechanism for reciprocating the rake, a control governed by the rake motivating mechanism and effective to move the rake to raised position when the operation of the rake is discontinued, and means for automatically lowering the rake to operating position when the operation of the rake is resumed.

3. A classifier comprising a tank adapted to contain a bath, a rake operable in the tank and having a lower operating position and a raised inoperative position, the rake having a portion thereof submerged in the bath when in operating position and unsubmerged when in raised position, means for operating the rake and electrically controlled hydraulic means for automatically moving the rake to raised position when the operation of the rake is discontinued.

4. A classifier comprising a tank adapted to contain a bath, a rake operable in the tank and having a lower operating position and a raised inoperative position, the rake having a portion thereof submerged in the bath when in operating position and unsubmerged when in raised position, means for operating the rake, electrically controlled hydraulic means for automatically moving the rake to raised position when the operation of the rake is discontinued and for automatically lowering the rake to operating position when the operation of the rake is resumed.

5. A classifier comprising a tank adapted to contain a bath, a rake operable in the tank and having a lower operating position and a raised inoperative position, the rake having a portion thereof submerged in the bath when in operating position and unsubmerged when in raised position, means for operating the rake, an hydraulic cylinder having a piston movable therein and connected to the rake, and means for maintaining a pressure in the cylinder during operation of the rake to maintain the rake in operating position and for automatically releasing the pressure when the operation of the rake is discontinued to thereby move the rake to raised position.

6. A classifier comprising a tank adapted to contain a bath, a rake operable in the tank and having a lower operating position and a raised inoperative position, the rake having a portion thereof submerged in the bath when in operating position and unsubmerged when in raised position, means for operating the rake, an hydraulic cylinder having a piston movable therein and connected to the rake, means for maintaining a pressure in the cylinder during operation of the rake to maintain the rake in operating position and for automatically releasing the pressure when the operation of the rake is discontinued to thereby move the rake to raised position and for causing and maintaining a pressure in the cylinder when the operation of the rake is resumed to automatically move the rake to operating position.

7. A classifier comprising a tank adapted to contain a bath, a rake operable in the tank and having a lower operating position and a raised inoperative position, the rake having a portion thereof submerged in the bath when in operating position and unsubmerged when in raised position, means for operating the rake, an hydraulic cylinder having a piston movable therein and connected to the rake, a pump, a conduit connecting the pump and the cylinder, a valve in the conduit and means for actuating the valve so that when the rake is in operating position, the pump is connected to the cylinder and when in raised position, the pump is disconnected from the cylinder.

8. A classifier comprising a tank adapted to contain a bath, a rake operable in the tank and having a lower operating position and a raised inoperative position, the rake having a portion thereof submerged in the bath when in operating position and unsubmerged when in raised position, means for operating the rake, an hydraulic cylinder having a piston movable therein and connected to the rake, a pump, a conduit connecting the pump and the cylinder, a valve in the conduit, means for maintaining the valve in a position to connect the pump with the cylinder to cause and maintain a pressure in the cylinder when the rake is in operating position and to automatically move the valve to disconnect the pump from the cylinder and to relieve the pressure in the cylinder and move the rake to raised position when operation of the rake is discontinued.

9. A classifier comprising a tank adapted to contain a bath, a rake operable in the tank and having a lower operating position and a raised inoperative position, the rake having a portion thereof submerged in the bath when in operating position and unsubmerged when in raised position, means for operating the rake, an hydraulic cylinder having a piston movable therein and connected to the rake, a pump, a conduit connecting the pump and the cylinder, a valve in the conduit, means for maintaining the valve in a position to connect the pump with the cylinder to cause and maintain a pressure in the cylinder when the rake is in operating position and to automatically move the valve to disconnect the pump from the cylinder and to relieve the pressure in the cylinder and move the rake to raised position when operation of the rake is discontinued and to automatically move the valve to connect the pump and cylinder and cause and maintain a pressure in the cylinder and move the rake to operating position when operation of the rake is resumed.

10. A classifier comprising a tank adapted to contain a bath, a rake operable in the tank and having a lower operating position and a raised inoperative position, the rake having a portion thereof submerged in the bath when in operating position and unsubmerged when in raised position, means for operating the rake, a cylinder having a piston movable therein, and connected to the rake, a weight connected to the piston, a pump, a conduit connecting the pump and cylinder and adapted to cause and maintain a pressure in the cylinder, an electrically operated valve in the conduit between the pump and cylinder, a governor operated by the rake operating means, and an electric circuit maker and breaker operated by the governor and electrically connected to said valve, whereby when the operation of the rake is discontinued, the rake is moved to and maintained in raised position and when the operation of the rake is resumed, the rake is moved to operating position.

11. A classifier comprising a tank adapted to contain a bath, a rake operable in the tank and having a lower operating position and a raised inoperative position, the rake having a portion thereof submerged in the bath when in operating position and unsubmerged when in raised position, means for operating the rake, a cylinder having a piston movable therein, and connected to the rake, a weight connected to the piston, a pump, a conduit connecting the pump and cylinder and adapted to cause and maintain a pressure in the cylinder, an electrically operated valve in the conduit between the pump and cylinder, a reservoir tank, another conduit connecting the reservoir tank and the pump, a third conduit connecting the first mentioned conduit and the reservoir tank, a governor operated by the rake operating means, an electric circuit maker and breaker operated by the governor and electrically connected with said valve, whereby when operation of the rake is discontinued, said valve is moved to disconnect the pump from the cylinder and to connect the cylinder with the reservoir tank to cause the rake to be moved to raised position and when the operation of the rake is resumed, the valve is moved to connect the pump and cylinder and the rake is moved to operative position.

HAROLD B. COULTER.